(12) United States Patent
McCoy et al.

(10) Patent No.: US 11,360,247 B2
(45) Date of Patent: Jun. 14, 2022

(54) PORTABLE DETECTION SYSTEMS AND DEVICES INCLUDING A DETECTOR THAT DETECTS REFLECTED ENERGY

(71) Applicant: 3M INNOVATIVE PROPERTIES COMPANY, St. Paul, MN (US)

(72) Inventors: Michael A. McCoy, St. Paul, MN (US); John Allen Wheatley, Stillwater, MN (US); Gilles J. Benoit, Minneapolis, MN (US); Charles Allen Shaklee, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 51 days.

(21) Appl. No.: 16/638,990

(22) PCT Filed: Oct. 25, 2018

(86) PCT No.: PCT/US2018/057581
§ 371 (c)(1),
(2) Date: Feb. 13, 2020

(87) PCT Pub. No.: WO2019/084314
PCT Pub. Date: May 2, 2019

(65) Prior Publication Data
US 2020/0363572 A1    Nov. 19, 2020

Related U.S. Application Data

(60) Provisional application No. 62/578,337, filed on Oct. 27, 2017.

(51) Int. Cl.
*G02B 5/128* (2006.01)
*G06F 1/16* (2006.01)

(52) U.S. Cl.
CPC ............ *G02B 5/128* (2013.01); *G06F 1/163* (2013.01)

(58) Field of Classification Search
None
See application file for complete search history.

(56) References Cited

U.S. PATENT DOCUMENTS

| 8,764,202 | B1 | 7/2014 | Kimball |
| 2003/0062046 | A1 | 4/2003 | Wiesmann |
| 2008/0074652 | A1 | 3/2008 | Fouquet |
| 2011/0305006 | A1 | 12/2011 | Hehenberger |
| 2013/0242283 | A1 | 9/2013 | Bailey |
| 2015/0029050 | A1 | 1/2015 | Driscoll |

(Continued)

FOREIGN PATENT DOCUMENTS

| CN | 104 660 995 | 5/2015 |
| GB | 2 327 753 | 2/1999 |

OTHER PUBLICATIONS

International Search Report for PCT International Application No. PCT/US2018/057581, dated Feb. 12, 2019, 4 pages.

*Primary Examiner* — Jennifer D. Carruth

(57) ABSTRACT

A portable detection system comprises an energy source configured to transmit energy, a retroreflective article, a detector configured to sense retroreflective energy produced by interaction of the energy transmitted from the source and the retroreflective article, and an indicator that indicates the detection of the retroreflective energy, wherein at least one of the energy source and the detector are configured to be worn by a user.

18 Claims, 4 Drawing Sheets

(56) References Cited

U.S. PATENT DOCUMENTS

2015/0170421 A1  6/2015 Mandella
2016/0074724 A1  3/2016 Terre
2018/0330601 A1* 11/2018 Sabolcik ............... H04W 84/18

* cited by examiner

PORTABLE DETECTION SYSTEMS AND DEVICES INCLUDING A DETECTOR THAT DETECTS REFLECTED ENERGY

FIELD

This disclosure relates to portable detection systems and devices that include a detector that detects reflected energy, and a source of energy that interacts with a reflective article, resulting in the reflected energy, where reflected energy may be retroreflective energy.

BACKGROUND

Reflective materials have been developed for use in a variety of applications, including road signs, license plates, footwear, and clothing patches to name a few. Reflective materials are often used as high visibility trim materials in clothing to increase the visibility of the wearer. For example, reflective materials are often added to protective garments worn by firefighters, rescue personnel, EMS technicians, and the like.

Retroreflectivity can be provided in a variety of ways, including by use of a layer of tiny glass beads or microspheres that cooperate with a reflective agent, such as a coated layer of aluminum. The beads can be partially embedded in a binder layer that holds the beads to fabric such that the beads are partially exposed to the atmosphere. Incident light entering the exposed portion of a bead is focused by the bead onto the reflective agent, which is typically disposed at the back of the bead embedded in the binder layer. The reflective agent reflects the incident light back through the bead, causing the light to exit through the exposed portion of the bead in a direction opposite the incident direction.

SUMMARY

Disclosed are systems that include a source of energy that emits or transmits energy; a detector that detects retroreflective energy produced by interaction of the energy from the source with a retroreflective article; and an indicator that indicates the detection of the retroreflective energy.

Also disclosed are transceivers that include a source of energy that transmits energy and a detector that detects retroreflective energy produced by interaction of the energy from the source with a retroreflective article; and an indicator that transfers the retroreflective energy into a different kind of energy.

In one embodiment, the system may be portable. Portable systems may include, for example, battery-operated systems, hand-held systems and wearable systems that are movable or readily transportable during or between uses, and systems that are carried, worn or otherwise secured to an individual who moves around, or worn or otherwise secured to an animal, such as a rescue animal. Wearable systems may include those that are incorporated into clothing and turnout gear (e.g. clothing such as boots, trousers, suspenders, jackets, coats, overalls, gloves), eyewear (e.g. spectacles, goggles and visors), head gear (e.g. hats and helmets), wearable equipment and appliances, and other accessories.

Also disclosed are wearable articles that include a source of energy that transmits energy; a detector that detects retroreflective energy produced by interaction of the energy from the source with a retroreflective article; and an indicator that indicates at least the presence of the retroreflective energy to a user wearing the wearable article.

Systems and techniques according to the disclosure may improve tracking and/or detection of personnel (e.g. firefighters, first responders, etc.) and objects (e.g. buildings, equipment, obstacles) in adverse conditions, such as poorly illuminated, hazy or smoky conditions which can attenuate signal to noise content, thereby making it difficult to detect objects, infrastructure, vehicles, or people, whether by visual inspection or by machine sensing.

According to one aspect of the disclosure, a wearable device configured to be worn by a user, such as, for example, a firefighter, is provided. The wearable device includes a source of energy configured to emit and/or transmit energy having at least one predetermined characteristic and a detector configured to detect reflected energy resulting from interaction of the energy transmitted from the source and a reflective article. The wearable device includes a processor in communication with the detector, the processor configured to initiate at least one action based on detected reflected energy. In a more specific embodiment, the processor is able to combine data from different detectors on the user. Thus, in a specific embodiment, the processor may be configured to combine, for example, thermal and retroreflected signals to construct a composite image or combined data analysis.

According to one embodiment of this aspect, the wearable device is a self-contained breathing apparatus (SCBA). According to one embodiment of this aspect, the reflected energy is retroreflective energy and the reflective article is a retroreflective article. According to one embodiment of this aspect, the energy transmitted by the source of energy is polarized light, the at least one predetermined energy characteristic being at least one of linear polarized light, elliptically polarized light and circularly polarized light. According to another embodiment, the characteristic may be an optical, temporal, or spatial characteristic, or combinations thereof.

According to one embodiment, the source of energy is a source of ultraviolet energy, near-infrared energy, or some combination thereof. According to one embodiment of this aspect, the wearable device further includes an indicator, the indicator being a visible indicator, an audible indicator, a sensory indicator, or a combination thereof. In some embodiments, the indicator may not be collocated with or physically connected to the wearable device. That is, in some embodiments, the indicator may be a mobile device such as a cell phone or an augmented reality (AR) or virtual reality (VR) set connected to the wearable device via wireless communication such as Bluetooth. According to one embodiment of this aspect, the processor is configured to compare the at least one predetermined characteristic of the transmitted energy with at least one predetermined characteristic of the reflected energy, the at least one action being based on the comparison.

According to one embodiment, the wearable device may further include a display where the processor is configured to convert information from the detector into an image on the display. According to one embodiment of this aspect, the display is configured to provide at least one of virtual reality and augmented reality. According to one embodiment of this aspect, the wearable device is wearable on at least one of a head of a user, and an appendage of the user.

According to another embodiment, the source of energy is associated with head movement of the user. According to one embodiment of this aspect, the wearable device is a mask. According to one embodiment of this aspect, the reflected energy corresponds to a code; and the processor is configured to decode the code for display. In some embodiments, a single characteristic about the light may be processed on-board or on-chip. In other embodiments, the processor may send data to the cloud as input to a machine learning model and the processor may receive information back about the data, such as a classification.

According to one aspect of the disclosure, a method for a wearable device configured to be worn by a user is provided. Energy having at least one predetermined characteristic is transmitted. Reflected energy resulting from interaction of the energy transmitted from the source and a reflective article is detected. At least one action is initiated based on the detected reflected energy.

According to another embodiment, the wearable device is a self-contained breathing apparatus (SCBA). According to one embodiment of this aspect, the transmitted energy is polarized light, the at least one predetermined energy characteristic being at least one of linear polarized light, elliptically polarized light and circularly polarized light. According to one embodiment of this aspect, the at least one predetermined characteristic of the transmitted energy is compared with at least one predetermined characteristic of the reflected energy, the at least one action being based on the comparison.

According to another aspect of the disclosure, information from the detector is converted into an image on a display, the display being configured to provide at least one of virtual reality and augmented reality. According to one embodiment of this aspect, the wearable device is wearable on at least one of a head of a user, an appendage of the user. According to one embodiment of this aspect, the reflected energy corresponds to a code, and the code is decoded for display.

The above summary is not intended to describe each embodiment of the present disclosure. The details of one or more embodiments of the present disclosure are also set forth in the description below. Other features, objects, and advantages of the present disclosure will be apparent from the description and from the claims.

BRIEF DESCRIPTION OF DRAWINGS

The disclosure may be more completely understood in consideration of the following detailed description of various illustrative embodiments in connection with the accompanying drawings, in which.

Figure 1:
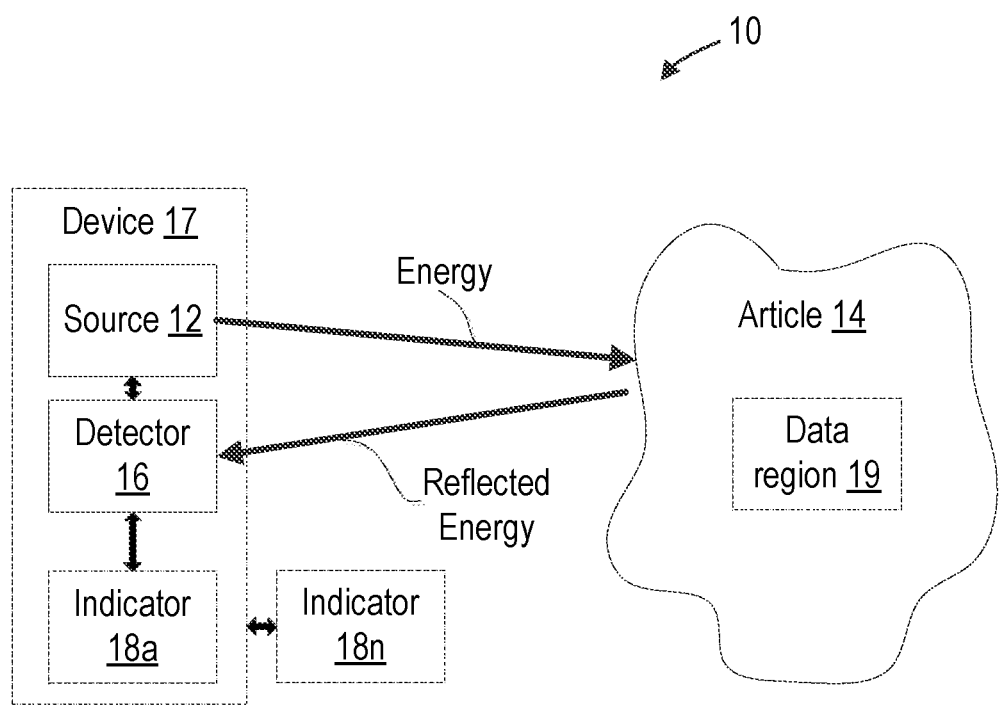
FIG. 1 is a block diagram of an exemplary system for detection of reflected energy in accordance with the principles of the disclosure.

It is to be understood that the embodiments may be utilized and structural changes may be made without departing from the scope of the disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

This disclosure describes reflective articles that include a discontinuous reflective layer. In some cases, this disclosure describes the garment itself, e.g., an outer layer or outer shell of a protective outfit. In other cases, this disclosure describes an article, such as a clothing patch that may be added to a protective garment. In still other cases, this disclosure describes a protective outfit that includes the reflective article on an outer shell and additional layers such as a thermal liner and a moisture barrier.

The terms "articles" and "reflective articles" are used interchangeably herein.

The term "reflectivity" as used herein corresponds to redirection of light from a given material. The term "retroreflection" as used herein means reflection of light back toward the light source from a given material, where retroreflection provides one or more specific embodiments of reflectivity.

The term "ultraviolet" refers to energy having a wavelength in the range from 100 nanometers (nm) to 400 nm. The term "ultraviolet spectrum" refers to the wavelength range from 100 nm to 400 nm.

The term "visible" refers to energy having a wavelength typically visible by the naked human eye and in some embodiments refers to energy having a wavelength in the range from 400 nm to 700 nm. The term "visible spectrum" refers to the wavelength range from 400 nm to 700 nm.

The term "near infrared" refers to energy having a wavelength in the range from 700 nm to 2500 nm. The term "near infrared spectrum" refers to the wavelength range from 700 nm to 2500 nm.

The term "data" and/or "data rich" as used herein means information that is readily machine interpretable.

Optical articles, such as reflective and/or retroreflective articles, redirect light incident on the article, such as retroreflective articles, that redirect light incident on the article back toward its source. This property has led to many practical applications of retroreflective articles in the areas of traffic and personal safety. Retroreflective articles are currently used for traffic signs, car license plates, pavement markings, construction zone cones and barrels, and high visibility material on clothing worn by users (e.g., workers, pedestrians, animals, etc.).

Retroreflective material is a critical safety feature for first responder uniforms and provides night-time and low-light level conspicuity by providing a strong retroreflective visible signal to the observer. One or more embodiments of disclosed systems can include a source and a detector that detects retroreflective energy produced by interaction of the energy from the source with a retroreflective article. In some embodiments, disclosed systems can be included as part of a wearable system that provides the ability to detect and recognize retroreflective signals.

Disclosed systems can provide a direct image using ultraviolet light, visible light, near infrared light, or any combination thereof. Disclosed systems can also include components to detect geometric details of the retroreflective image that can be used to provide additional information regarding the origin of the image (e.g., is the signal coming from a human wearer, possible details of a human wearer, is the signal coming from a specific object, details of the specific object, or any combinations thereof).

Referring now to the drawing figures where like reference designators refer to like elements, FIG. 1 illustrates an exemplary portable system for detecting reflected energy, generally referred to as "system 10". The system 10 includes one or more sources 12 of energy (hereinafter referred to as source 12) that emit energy. The emitted energy interacts with an article 14, resulting in reflected energy. The system 10 includes one or more detectors 16 that detect the energy reflected from article 14. The system 10 can also optionally include one or more indicators 18a-18 (collectively referred to as indicator 18).

The source 12 transmits, i.e., emits, energy and the detector 16 senses or detects energy resulting from the interaction of the energy from the source 12 with an article 14. The source 12 can therefore be generally described as providing energy that can result in a signal that can be detected by the detector 16. The source 12 and detector 16 can be within a single article or device (i.e., device 17 described in detail with respect to FIG. 2) or in separate articles or devices. That is, in some embodiments, the system 10 may include a transceiver configured to both transmit and detect energy. Configured in this manner, the system may include a transceiver that serves the purpose of both the source 12 and the detector 16. In one embodiment, the transceiver may be, for example, a wearable transceiver. In another embodiment, the transceiver may be an accessory used to modify a hand-held device. In a specific embodiment, the transceiver may include a plurality of detectors 16 able to detect different types of light using, for example, wavelength selective detectors and/or detectors able to detect one or more of circular polarized light, linear polarized light, etc. In a specific aspect, the output of a detector 16 may be integrated with the output of at least one other detector. In another embodiment, the wearable transceiver may include a processor that uses two or more images containing temporally variant polarization information. In another aspect, the wearable transceiver may contain a retroreflective article on its surface that may be used as a data source or communication medium to another transceiver, such as a wearable transceiver or a vehicular transceiver.

In one or more embodiments, source 12 can include sources of ultraviolet energy (UV), visible energy, near infrared (NIR) energy, or any combinations thereof. Illustrative sources can be a broad wavelength band within a spectra regime or crossing a spectral regime, a relatively defined narrow band, or any combination thereof. In some illustrative embodiments, energy from the source can be filtered to affect the wavelengths that can interact with the reflective article 14, to affect the polarization state that can interact with the reflective article 14 (e.g., linear polarized or circularly polarized energy). In some embodiments, an illustrative system 10 can include more than one source 12, which may or may not provide different wavelengths. Multiple sources 12, such as daytime vision (i.e. photopic vision) and night-time (i.e. scotopic vision) sources may be utilized to provide reflected energy from different types of reflective articles 14.

In one or more embodiments, the article 14 may be configured to preserve, filter, enhance, or transform one or more polarization components of incident light. In some examples, a polarized light source 12 or the detector 16 may include spatially variant information or polarization modifying features. Such polarization modifying features may generate spatial or temporal patterns, for example, spatial or temporal variations in polarization state or intensity of particular polarizations. Such patterns may be detected as machine-readable information in the visible or near infrared spectrum, while having a low, reduced, or negligible visible perception. Such patterns may be optimized by machine learning techniques such as generative adversarial networks (GAN) to improve signal discrimination. For example, an article 14 including spatially variant polarization properties can modify the polarization state of incident light so that a pattern or code can be detected by the detector 16. While spatial variance may be useful in some examples, in other examples, spatial variation may not be utilized. For example, the light directing article 14 may include a retroreflector that is dissimilar from surrounding materials, thus returning to the detector 16 a different signal than other articles or objects in the field of view, without itself being spatially variant. Thus, example systems and methods for detecting polarization states of received light are described.

In some embodiments, the article 14 can include at least one data region 19 or data rich region. The at least one data region 19 can provide the user or wearer of system 10 with additional information about the detected reflective article. In one or more embodiments, an optional processor and/or processing circuitry can be used to process information from the at least one data region 19, for example by including an inference engine in or configured with the processor, or a look up table in or in communication with the processor, including cloud computing via, for example, cloud application programming interface (Cloud API), as discussed in detail with respect to FIG. 2. In some illustrative embodiments, the at least one data region 19 can include, for example, a barcode, a quick response code (QR code), or other machine readable code or label with similar information.

In one or more embodiments, detectors 16 may include a thermal imager or other imaging device, such as a pyroelectric eye that can "see" an image. In another aspect, the detectors may include cameras (e.g., cameras capable of capturing ultraviolet light, visible light, near infrared light, or otherwise), a charge-coupled device (CCD), a complementary metal oxide semiconductor (CMOS) sensor, or any other detector capable of generating a signal in response to detecting photons of light having a predetermined characteristic (for example, a range of wavelengths or intensities, or other optical, temporal, or spatial characteristics, or combinations thereof.). In other embodiments, the system 10 may include a detection system including a variable optional retarder, such as a liquid crystal panel with a linear polarizer. In some illustrative embodiments, the detector 16 can optionally contain or be configured with optical filters in order that only certain wavelength ranges, certain polarization states, or combinations thereof can reach the detector 16.

In some embodiments, the detector 16 may substantially only allow light of a predetermined polarization to pass through, for example, a predetermined polarization component of deflected light. For example, detector 16 may substantially only allow right-circularly polarized light to pass through, so that a linearly polarized component or a left-circularly component of deflected light does not pass through detector 16. In such an example, detector 16 may substantially only receive (and therefore, sense) right-circularly polarized light, and generate a signal indicative of the presence of right-circularly polarized light.

Signals (e.g., reflected signals, retroreflected signals, etc.) detected by detector 16 can be used to link to technical information such as ID, safety information, lookup data, and/or coding. In some embodiments, the detected signal may include, for example, codes or text that are invisible to the unaided eye, whereby the detected signal can provide information such as access panel information or warning information regarding concealed or hidden electrical wiring and/or plumbing (e.g., a warning to not drill or cut at a particular location).

In some embodiments, the indicator 18 can be used to communicate or indicate that the detector 16 has detected the reflected energy. The indicator 18 can be a visible indictor (e.g., a view screen that indicates a detection by the detector 16), a sensory indicator including, for example, a haptic sensor (e.g., using pressure or vibration) or other physical sensors, or other indicator types. Illustrative sensory indicators include audible indictors (e.g., a device that makes some kind of audible noise to indicate a detection by the detector 16), physical indicators (e.g., a device that produces some kind of motion, for example, to indicate a detection by the detector 16), or other sensory indicators. Different types of feedback could be provided for different reflective articles. In one or more embodiments, indicator 18 is included in device 17.

In other embodiments, a detected signal can be used or viewed directly by the end-user (e.g. through glasses or goggles) provided the optical signal is processed through an appropriate modified viewer containing, for example, suitable filters and/or image intensifiers. Configured in this manner, it will be recognized that the system 10 need not include, for example, a camera. In another embodiment, the detected reflected signal from a personal transceiver may communicate with both a wearer and a vehicle. In this manner, the transceiver may provide feedback to a vehicle about the location of the wearer (e.g. indicating the wearer is in a hazardous location). That is, the vehicle may have a certain reflective optical signature that can only be detected if the wearer's detector is within a certain pre-determined observation angle (i.e. "hazard zone").

In some embodiments, system 10 can include more than one detector 16, which may or may not detect energy (e.g., reflected energy and/or retroreflected energy from article 14) of different wavelengths. Multiple detectors 16 may be utilized to detect energy at different wavelengths which may or may not be coming from different articles.

Figure 2:
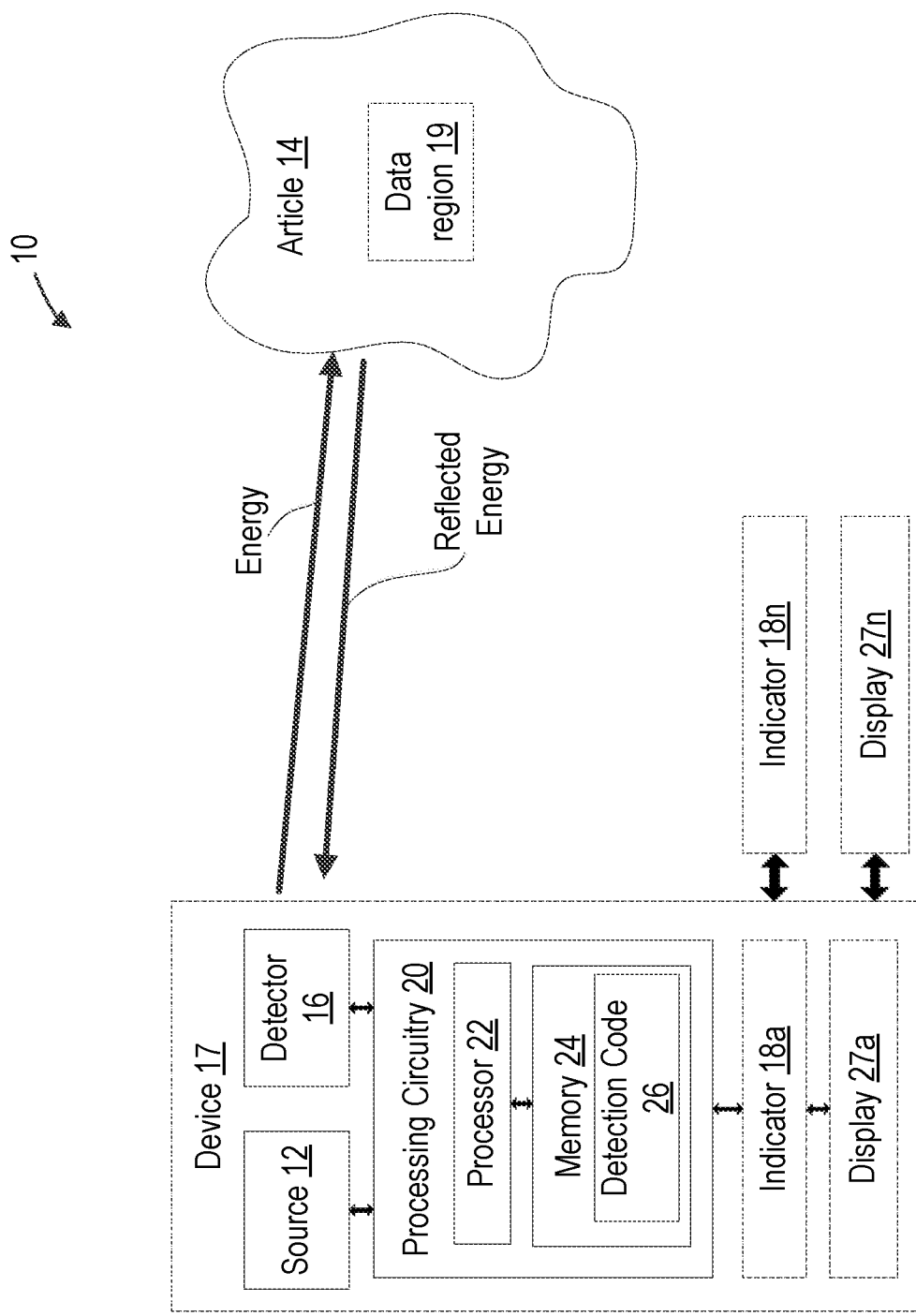
FIG. 2 is another block diagram of the exemplary system for detection of reflected energy in accordance with the principles of the disclosure.

FIG. 2 is an exemplary embodiment of system 10 in accordance with the principles of the invention. Device 17 includes source 12, detector 16 and may optionally include indicator 18 as described above. Device 17 includes processing circuitry 20 that may include a processor 22 and memory 24. In particular, in addition to or instead of a processor, such as a central processing unit, and memory, the processing circuitry 20 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 22 may be configured to access (e.g., write to and/or read from) memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Memory 24 may include at least one of an inference engine, look-up table(s) and software code such as detection code 26. For example, detection code 26 is configured to perform the process of FIG. 3, described below. In one or more embodiments an inference engine and/or look-up table may be used to decode a reflected signal that corresponds to a code such as machine readable code.

In some embodiments, system 10 can optionally include one or more displays 27a-27n (collectively referred to as display 27). The display 27 may include, for example, an augmented reality display, a virtual reality display or a head-up-display (HUD) transparent display. The display may also include a direct display such as filter modifications to eyeglasses, direct view displays such as OLED, and LED display, projected view displays containing projected images, or displays incorporated into augmented reality or virtual reality systems. Incorporation of a display screen can be useful to allow the indicator 18 to provide a visual indication to the user of what was detected by the detector 16. The display 27 can show an image that has been converted, by a processor 22, for example, from the information detected by the detector 16.

Figure 3:
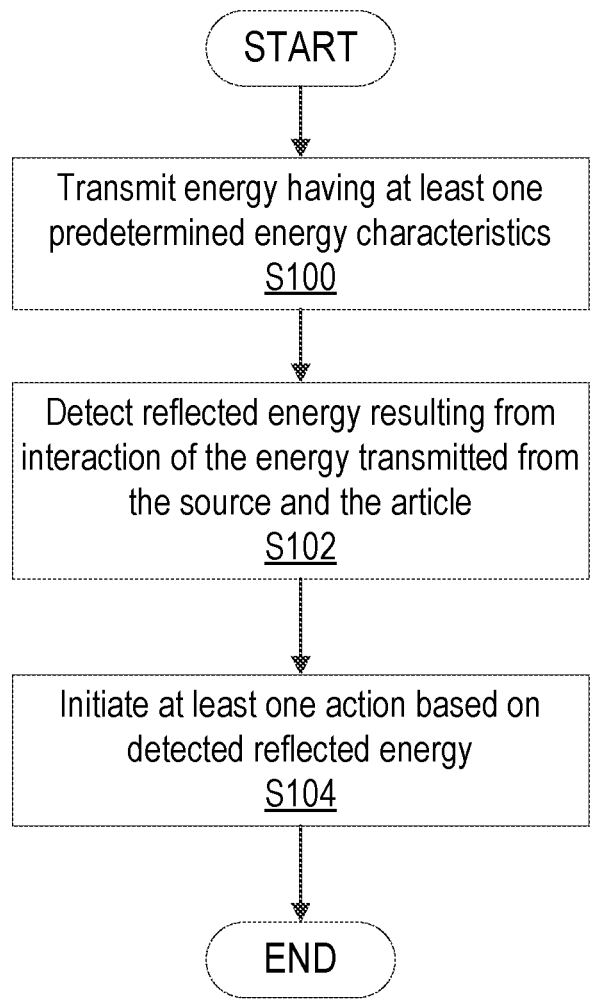
FIG. 3 is a flow diagram of the detection process for detection of reflected energy in accordance with the principles of the disclosure.

FIG. 3 is a flow diagram of an example detection process of detection code 26 in accordance with the principles of the invention. One or more Blocks described herein may be performed by one or more elements of device 17 such as processing circuitry 20, source 12, detector 16, indicator 18 and/or display 27. The device 17, such as via source 12, is configured to transmit energy having at least one predetermined energy characteristic (Block S100). The device 17, such as via detector 16, is configured to detect reflected energy resulting from interaction of the energy transmitted from the source 12 and an article 14 (Block S102). The device 17, such as via processing circuitry 20, is configured to initiate at least one action based on the detected reflected energy (Block S104). In one or more embodiments, the at least one action may include triggering an indicator. In one or more embodiments, the at least one action may include causing display of information on a display such as a HUD associated with a user. In one or more embodiments, the at least one action may include one or more actions capable of being caused and/or performed by device 17.

In one or more embodiments, processing circuitry 20 is configured to receive a signal from detector 16 indicating a reflected signal has been received. In one or more embodiments, processing circuitry 20 is configured to determine the at least one characteristic of reflected energy received by detector 16. For example, the at least one characteristic of the energy may include, for example, an optical, temporal, or spatial characteristic, or combinations thereof. Including polarization of the energy, component(s) of an electric field of an electromagnetic field such as the received energy and other measurable property of an electromagnetic field.

The components of an electric field (Ex, Ey) may indicate the polarization of the electromagnetic field. In one or more embodiments, processing circuitry 20 may compare the at least one characteristic of the energy transmitted by source 12 with at least one characteristic of the energy received by detector 16 to determine the change in the at least one characteristic caused by article 14.

In one or more embodiments, the processor 22 can be configured to receive information from the detector 16, for example. The processor 22 can be configured to determine, for example, some information about the reflective article 14, some information about the environment in which the reflective article 14 is located, an image of the reflective article 14, or some combination thereof. In one embodiment, the processor 22 is able to combine data from different detectors on the user. In this manner, the processor 22 may be configured to combine, for example, thermal and retroreflected signals to construct a composite image or combined data analysis. In some embodiments, the processor 22 can include or be configured with an algorithm inference engine. In some embodiments, a processor 22 could include or can communicate with an algorithm that can be designed to detect specific geometric features within the reflective image and provide both detection and recognition. Examples of information that could be determined by the algorithm can include, for example, features that can recognize or identify firefighters, other emergency personnel, or combinations thereof.

Figure 4:
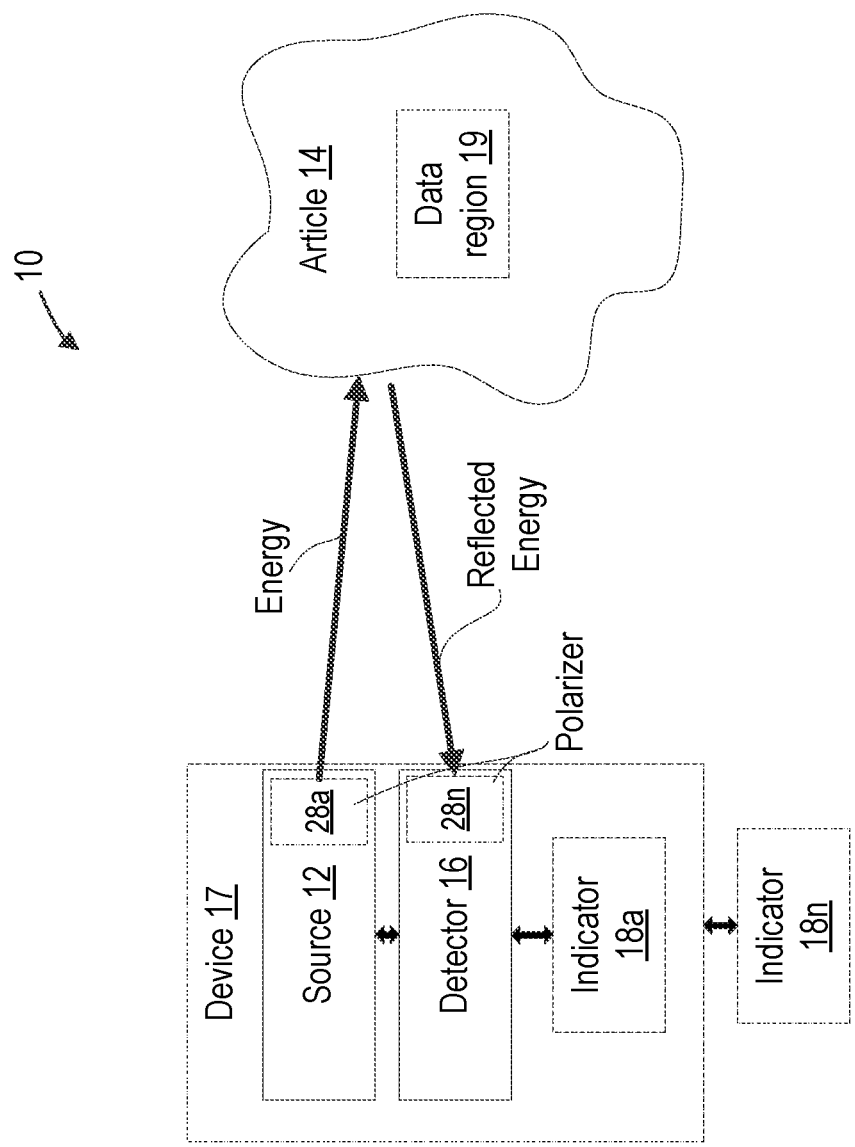
FIG. 4 is another block diagram of another exemplary system for detection of reflected energy in accordance with the principles of the disclosure.

FIG. 4 is an example system 10 that optionally includes one or more polarizers 28 in accordance with the principles of the invention. For example, source 12 may be configured to transmit unpolarized light and/or polarized light (with the use of polarizer 28). In one or more embodiments, energy transmitted by the source 12 may include linear polarized (for example, s-polarized or p-polarized) or a circular polarized (for example, right-circularly polarized or left-circularly polarized) light. One or more characteristics such as optical characteristics (i.e., characteristics of energy) may include frequency, wavelength, or polarization state of the transmitted energy or deflected light may vary temporarily, for example, in response to movement, an obstruction, or a change in proximity. For example, a polarized source may transmit in a predetermined temporally variant pattern including temporal or spatial changes in one or more of frequency, wavelength or polarization state. In one or more embodiments, one or more polarizers may be included in source 12 and/or positioned proximate to source 12.

The polarized light source 12 may include, for example, one or more source 12 elements that emit visible or non-visible wavelengths of light including both coherent light sources (e.g. laser) as well as incoherent light sources. More particularly, one or more source elements may include a diffuse light source, for example, one or more light emitting diodes (LEDs), incandescent sources, or fluorescent sources. In other examples, one or more source 12 elements may include a collimated source, for example, a laser or a lidar source. Polarized light source 12 may include a polarizer 28 that polarizes light emitted by one or more source elements to generate incident light having a predetermined polarization state. In examples in which the polarized light source 12 includes an element that inherently emits polarized light, for example, a lidar beam, the polarized light source may not include source polarizer, or may include polarizer 28 having a polarizing effect different from the inherent polarization of the polarized beam.

The energy transmitted by source 12 is reflected by article 14 such as by data region 19 of article 14 in which data region 19 may change at least one characteristic of the energy transmitted by source 12, i.e., the reflected energy is different in at least one characteristic from the energy transmitted by source 12. For example, as described herein, the article 14 and/or the data region 19 may alter or change the polarization of the energy transmitted by the source 12. In another example, a machine readable pattern or symbol(s) in data region 19 of article 14 change at least one characteristic of the energy transmitted by the source 12 such that the detected reflected energy corresponds to the machine readable pattern/symbol(s).

In some embodiments, source 12, detector 16 and processing circuitry 20 can be housed in more than one article 14 or device 17. In such systems, the elements can be attached to each other via one or more cables or wires, a wireless connection, or a combination thereof. For example, a processor 22 provides signal processing and/or processes inference engine code where processor 22 could be mounted onto the wearer, but one or more of the source 12, the detector 16, the indicator 18 can communicate via a wireless signal connection with processor 22. Another example includes image processing components located in a position away from the user or wearer that communicate with the sensor, detector 16, or both and indicator 18 remotely. In one or more embodiments, detector 16 may detect reflected energy that originated from different sources 12 or a source not included in device 12 such as a source 12 associated with another device 17 or independent source 12 in the environment.

In some embodiments, disclosed systems or components thereof can be incorporated into, or be part of a wearable device including, for example, mountable and hand-held devices 17. Hand-held devices 17 include but are not limited to, for example, a custom standalone device, a mobile phone, tablet or digital camera. That is, a disclosed system 10 or component thereof can be held by a user in their hand, can be part of a piece of a wearable device 17 or article 14, can be attached to another article that is wearable, or any combination thereof. Illustrative examples of such articles include those that can be mounted directly onto a wearer, such as an armband, a leg band, or a headband; or it can be attached to another article such as a harness, a belt, a hat, a helmet, a mask, a piece of clothing, etc. In systems that are part of a helmet, mask, hat or headband, at least one or more of the source 12, the detector 16, and the optional indicator 18, can be designed to move in concert with the wearer's head movements. This can allow the field of view to be coincident with the wearer's field of vision. In systems that are handheld, the user can position the unit in a fashion similar to guiding the illumination of a flashlight. This can allow the field of view to be chosen irrespective of the wearer's field of vision.

A specific illustrative example could include a system 10 that provides an image to a user on a display 27 that only shows features that have retroreflective information from a certain range of optical wavelengths, polarization states, or both. The user or wearer could monitor the feedback from the system 10 using an image monitor that could be hand-held, mounted onto the wearer's body, or both, for example.

Another specific illustrative example could include a "heads-up" display system in which the indicator 18 is an image displayed on a display 27. The image could be visible in real time, in combination with the normal visual field, or both. Such an illustrative system could be integrated into a hat, a helmet, a mask (e.g., a mask used on a supplied air respirator or as part of a self-contained breathing apparatus (SCBA)), or other device that is associated with a user's head, for example. In some illustrative embodiments in which the device 17 is integrated or used in combination with a mask, the image display could be small enough to be completely contained within the mask. Such a device 17 could provide visual feedback about the detected retroreflective article but still maintain mask hermeticity in a respirator application, for example. A specific illustrative example could include incorporating a display 27 into the shield of a respirator mask. This could be accomplished by using a thermal imaging (far-IR) camera in combination with a UV, visible, NIR, or any combination thereof source.

The disclosed system 10 detects reflective articles 14 such as retroreflective articles by providing a source 12 of energy that transmits energy, resulting in reflected energy from the reflective article 14. Any material or structure that is reflective or produces or results in reflected energy when energy from a source 12 that is part of the system 10 interacts with it can be used herein. In one or more embodiments where reflective article 14 is retroreflective, retroreflective materials can include but are not limited to: 1) 3M™ SCOTCHLITE™ Reflective Material 8906 Silver Fabric Trim (3M Company, St Paul, Minn.); 2) 3M™ SCOTCHLITE™ Reflective Material C750 Silver Transfer Film (3M Company, St Paul, Minn.); 3) 3M™ SCOTCHLITE™ Reflective Material C790 Carbon Black Stretch Transfer Film (3M Company, St Paul, Minn.); 4) 3M™ SCOTCHLITE™ Reflective Material 8710 Silver Transfer Film (3M Company, St Paul, Minn.); 5) 3M™ SCOTCHLITE™ Reflective Material 8986 Fluorescent Red-Orange Flame Resistant Fabric (3M Company, St Paul, Minn.); and 6) 3M™ SCOTCHLITE™ Reflective Material 8987 Fluorescent Lime-Yellow Flame Resistant Fabric (3M Company, St Paul, Minn.), for example. Any of such retroreflective materials may be part of a garment that is worn, applied to or be part of an object, or any combination thereof, for example.

Also disclosed herein are transceivers that include a source 12 as discussed above, a detector 16 as discussed above, and an optional indicator 18 as discussed above that transfers the reflected energy into a different energy. For example, disclosed transceivers can convert, transform, or transfer the reflected energy into an image on a screen, audible energy, vibrational energy, or any combination thereof.

Also disclosed herein is wearable device 17 such as a wearable article that includes a source 12 as discussed above and a detector 16 as discussed above. In some embodiments, such a wearable device 17 can also optionally include an indicator 18 that indicates at least the presence of the reflected energy to a user wearing the wearable device 17. The indicator 18 can take any of the forms above, for example.

Also disclosed herein are systems 10 and/or devices 17 in which the source 12 and the detector 16 may be associated with a vehicle, such as an emergency response vehicle (e.g., police car, ambulance, fire truck) or a drone. Such illustrative systems 10 and/or devices 17 can also include an optional processor 22 to receive information from the detector 16. In some embodiments, the processor 22 can also be configured to communicate with the vehicle itself in order to communicate information about the reflective article 14. Such illustrative systems 10 and/or devices 17 can also include optional indicators 18 that can be configured to indicate the detected reflective article 14 to an operator of the vehicle, for example.

SOME EMBODIMENTS

Embodiment 1

A system 10 comprising:
a source 12 of energy that emits or transmits energy;
a detector 16 that detects retroreflective energy produced by interaction of the energy from the source with a retroreflective article 14; and
an indicator 18 that indicates the detection of the retroreflective energy.

Embodiment 2

The system 10 according to any of the preceding Embodiments, wherein the source 12 of energy comprises a source of ultraviolet energy, visible energy, near-infrared energy, or some combination thereof.

Embodiment 3

The system 10 according to any of the preceding Embodiments, wherein the source 12 of energy is a source of ultraviolet energy, near-infrared energy, or some combination thereof.

Embodiment 4

The system 10 according to any of the preceding Embodiments, wherein the detector 16 comprises an imaging device such as a thermal imager, a camera or a pyroelectric sensor/detector.

Embodiment 5

The system 10 according to any of the above Embodiments, wherein the indicator 18 comprises a visible indicator, an audible indicator, a physical indicator, or a combination thereof.

Embodiment 6

The system 10 according to any of the above Embodiments further comprising a processor 22.

Embodiment 7

The system 10 according to any of the above Embodiments, wherein the detector inputs information to the processor 22.

Embodiment 8

The system 10 according to any of the preceding Embodiments further comprising a display 27 screen.

Embodiment 9

The system 10 according to any of the above Embodiments, wherein the processor 22 converts the information from the detector into an image on the display 27 screen.

Embodiment 10

The system 10 according to any of the preceding Embodiments, wherein the system 10 is a wearable system.

Embodiment 11

The system 10 according to any of the above Embodiments, wherein the system 10 is wearable on the body of a user.

Embodiment 12

The system according to Embodiment 10, wherein the system 10 is wearable on at least one of the head and an appendage of a user.

Embodiment 13

The system 10 according to any of the above Embodiments, wherein the source 12 of energy is associated with head movement of a user.

Embodiment 14

The system 10 according to any of the above Embodiments, wherein the display 27 screen is configured in an article wearable on a head of a user.

Embodiment 15

The system 10 according to any of the above Embodiments, wherein the article is at least one of a mask and eyewear.

Embodiment 16

The system 10 according to any of the above Embodiments, wherein the retroreflective article 14 comprises at least one data rich region 19.

Embodiment 17

The system 10 according to any of the above Embodiments, wherein the processor 22 is configured to process information regarding one or more data rich regions 19 in the retroreflective article 14.

Embodiment 18

The system 10 according to any of the above Embodiments, wherein the processor 22 comprises an inference engine.

Embodiment 19

The system 10 according to any of the above Embodiments, wherein the processor 22 comprises a look up table.

Embodiment 20

The system 10 according to any of the above Embodiments, wherein the processor 22 is external to the source 12, detector 16, or both.

Embodiment 21

The system 10 according to any of the above Embodiments, wherein at least the processor 22 and the detector are configured together.

Embodiment 22

A transceiver comprising:
a source 12 of energy that transmits energy;
a detector 16 that detects retroreflective energy produced by interaction of the energy from the source 12 with a retroreflective article 14; and
an indicator 18 that converts and/or transfers the retroreflective energy into a different kind of energy.

Embodiment 23

A wearable article comprising:
a source 12 of energy that transmits energy;
a detector 16 that detects retroreflective energy produced by interaction of the energy from the source 12 with a retroreflective article 14; and
an indicator 18 that indicates at least the presence of the retroreflective energy to a user wearing the wearable article.

Thus, embodiments of articles and systems interacting with the same are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A wearable device configured to be worn by a user, the wearable device comprising:
a source of energy configured to transmit energy having at least one predetermined characteristic;
a detector configured to detect reflected energy resulting from interaction of the energy transmitted from the source and at least a reflective data region of a reflective article, the reflective data region including a machine readable code; and
a processor in communication with the detector, the processor configured to:
decode the machine readable code based on the detected reflected energy; and
initiate at least one action based on the decoded machine readable code.

2. The wearable device of claim 1, wherein the wearable device is part of a self-contained breathing apparatus (SCBA).

3. The wearable device of claim 2, wherein the reflected energy is retroreflective energy and the reflective article is a retroreflective article.

4. The wearable device of claim 3, wherein the energy transmitted by the source of energy is polarized light, the at least one predetermined energy characteristic being at least one of linear polarized light, elliptically polarized light and circularly polarized light.

5. The wearable device of claim 4, wherein the source of energy is a source of visible light, ultraviolet energy, near-infrared energy, and combinations thereof.

6. The wearable device of claim 5, wherein further comprising an indicator, the indicator being at least one of a visible indicator, an audible indicator, a sensory indicator, and combinations thereof.

7. The wearable device of claim 6, wherein the processor is configured to compare the at least one predetermined characteristic of the transmitted energy with at least one predetermined characteristic of the reflected energy, the at least one action being based on the comparison.

8. The wearable device of claim 7, further comprising a display, the processor configured to convert information from the detector into an image on the display.

9. The wearable device of claim 8, wherein the display is configured to provide at least one of virtual reality and augmented reality.

10. The wearable device of claim 9, wherein the wearable device is wearable on at least one of a head of a user and an appendage of the user.

11. The wearable device of claim 10, wherein the source of energy is associated with head movement of the user.

12. The wearable device of claim 11, wherein the wearable device is at least one of a mask and eyewear.

13. A method for a wearable device configured to be worn by a user, the method comprising:
transmitting energy having at least one predetermined characteristic;
detecting reflected energy resulting from interaction of the energy transmitted from the source and at least a reflective data region of a reflective article, the reflective data region including a machine readable code;
decoding the machine readable code based on the detected reflected energy; and
initiating at least one action based on the detected reflected energy.

14. The method of claim 13, wherein the wearable device is part of a self-contained breathing apparatus (SCBA).

15. The method of claim 14, wherein the transmitted energy is polarized light, the at least one predetermined energy characteristic being at least one of linear polarized light, elliptically polarized light and circularly polarized light.

16. The method of claim 15, further comprising comparing the at least one predetermined characteristic of the transmitted energy with at least one predetermined characteristic of the reflected energy, the at least one action being based on the comparison.

17. The method of claim 16, further comprising converting information from the detector into an image on a display, the display being configured to provide at least one of virtual reality and augmented reality.

18. The method of claim 17, wherein the reflected energy is retroreflective energy and the reflective article is a retroreflective article.

* * * * *